United States Patent Office 2,734,062
Patented Feb. 7, 1956

2,734,062

QUATERNARY SALTS OF BELLADONNINE AND METHOD OF MAKING THEM

Rudolf Hotovy and Ernst Jacobi, Darmstadt, and Willi Kuessner, Darmstadt-Eberstadt, Germany, assignors to E. Merck Chemical Works, Darmstadt, Germany, a corporation of Germany No Drawing. Application January 29, 1953, Serial No. 334,074

7 Claims. (Cl. 260—292)

This invention relates to quaternary salts of belladonnine and to a method of making them. The salts are new compounds and possess good curare-like action and superior tolerability in human therapy.

According to Henry, The Plant Alkaloids, Fourth Edition, 1949, pages 64, 65, and 71, belladonnine is a solanaceous alkaloid of the tropane group which includes derivatives of tropine and allied amino alcohols. It may occur in the plant *Atropa belladonna Linn.* which contains hyoscyamine with some hyoscine; atropine which may have resulted from racemization during extraction; and apoatropine and possibly belladonnine. It can be prepared from l-hyoscyamine or atropine, or better still, from apoatropine, or by esterification of isatropic acid or atrolactic acid with tropine or pseudotropine. The pure base is crystalline, M. P. 129°, and upon hydrolysis yields beta-isatropic acid and tropine. While belladonnine has been known for over 100 years, it has to our knowledge never been used clinically.

We have now discovered that new quaternary salts of belladonnine are obtained by reacting the alkaloid with alkylating agents, and that these salts have a curare-like action in which they are greatly superior to the outstanding curare alkaloid, d-tubocurarine. It was surprising to find that the salts of belladonnine not only are active but, in fact, are substantially better than d-tubocurarine.

According to our invention, belladonnine or its precursors are reacted with an alkylating agent, preferably one-half to one mole per nitrogen atom. If precursors are used, they are converted into the belladonnine derivatives simultaneously with or subsequently to the alkylation. As alkylating agents can be employed any alkylesters suitable for the preparation of quaternary ammonium compounds, preferably organic halogen compounds as alkyl or aralkyl halogenides which are considered to be esters of hydrohalogen acids. Esters of strong inorganic acids known in the art of alkylation, as for instance dimethylsulfate, can likewise be used. The addition of the alkylesters to belladonnine of its precursors occurs most readily upon heating the components with or without solvent. An excess of the alkylating agent can be used. If belladonnine is the reactant, a monoquaternary salt is generally formed at first even in the presence of two or more moles of alkylating agent, and this salt can be isolated by interrupting the reaction at that point. When precursors are used, they are heated with an alkylester until one-half to one mole of ester has been added. In that way between 50% and 100% of the compound present has been converted to the quaternary salt. The salt is transformed into the belladonnine derivative in the usual way, namely by stronger heating if atropine was the precursor or by esterification with isatropic acid or atrolactic acid if the precursor was tropine or pseudotropine. The last named reaction can be performed as follows: Two moles of tropine or pseudotropine are reacted with one to two moles of an alkylating agent and the reaction product is esterified with one mole of the dibasic isatropic acid or with two moles of atrolactic acid.

The quaternary ammonium compounds of belladonnine made in accordance with this invention are salts of the formula $C_{34}H_{42}O_4N_2.x$ alkylester in which $x$ is equal to 1 or 2. The term "alkylester" is meant to include, preferably, alkylhalogenides and aralkylhalogenides. The salts frequently crystallize with water of crystallization, and it may be noted here that the water content indicated in the examples was determined in air-dried materials. In many instances, the melting points are not very definite. In general, the new compounds are soluble in water, methanol, ethanol, difficultly soluble to practically insoluble in acetic ester, benzene, petrolether and diethylether. Provided that the absorption of the added alkylester does not interfere, as it frequently does in the case of iodides, the compounds show a characteristic ultraviolet spectrum with two adjacent major maxima at about 258 to 259 m$\mu$ and 261 to 262 m$\mu$. The coefficients of extinction set forth in the examples were determined in 0.1% aqueous solution or in dilute alcohol. The quaternary salts of belladonnine made in accordance with this invention give an intensive violet coloration when they are concentrated to dryness with fuming nitric acid and the residue is mixed with alcoholic potash lye. Precipitation occurs with Mayer's reagent.

The following examples illustrate our invention:

Example 1

3.2 g. belladonnine were dissolved in an excess of methyliodide in ether and kept at room temperature for a prolonged period of time. The separated crystals of belladonnine-bis-iodine methylate were recrystallized from water. The analysis agreed with the formula $$C_{36}H_{48}O_4N_2I_2 \cdot \tfrac{1}{2} H_2O$$

The yield was 4.0 g., M. P. 290° C. In this salt, the absorption spectrum of iodine is superimposed on the characteristic ultraviolet absorption spectrum of belladonnine. The extinction

was 6.6 for $\lambda=258$ m$\mu$ and 6.0 for $\lambda=261$ m$\mu$.

Example 2

3.2 g. belladonnine and 11.8 g. ethyliodide were refluxed for some time in 40 cc. xylene. The xylene was distilled off, the unreacted belladonnine extracted with acetic ester, and the remainder recrystallized from methanol-acetic ester to yield 2.4 g. of bis-quaternary salt, M. P. 286° C. and formula $C_{38}H_{52}O_4N_2I_2$. Again, the maxima of belladonnine are not clear in the ultraviolet spectrum. The extinction

was 6.35 for $\lambda=258$ m$\mu$ and 5.8 for $\lambda=262$ m$\mu$.

The same salt can be prepared by refluxing 3.2 g. belladonnine with 68 g. ethyliodide without diluent. When worked up in the usual manner, the reaction product was bis-iodoethylate, yield 4.2 g., M. P. 286° C.

Example 3

3.2 g. belladonnine were refluxed with 34.0 g. ethylbromide in 100 cc. acetone for 5 to 15 hours. Unreacted belladonnine and the monoquaternary salt formed were extracted with acetone. The bis-bromoethylate was recrystallized from water-acetone and melted at 98° to 101° C. The monoquaternary salt can be recrystallized from alcohol; it melts at 243° to 244° C. Eight hours' boiling yielded 3.5 g. bis-quaternary salt and 0.4 g. monoquaternary salt as well as 0.1 g. unchanged belladonnine. The relative proportions of the salts formed shift with changes in the duration of heating.

The monoquaternary salt showed maxima of absorption at 259 mµ and 262 mµ. The values of $$E_{1\,cm.}^{1\%}$$

at these wavelengths were 6.0 and 5.8 respectively. The bis-quaternary salt crystallizes from aqueous solvents with water of crystallization corresponding to the formula $C_{38}H_{52}O_4N_2Br_2+4H_2O$; its extinction $$E_{1\,cm.}^{1\%}$$

is 4.8 for each of the maxima of absorption at 258 and 261 mµ.

Example 4

13.8 g. belladonnine were dissolved in 30 cc. benzene and refluxed with 27 g. isopropyliodide for 3 hours. Unreacted belladonnine was separated by digestion with acetic ester or ether and the undissolved residue amounted to 3.1 g. of belladonnine-bis-iodisopropylate.

Likewise the corresponding quaternary salt is obtained by reacting belladonnine with secondary or normal butyl bromide.

Example 5

4.0 g. belladonnine and 9.7 g. isoamyliodide were refluxed in 40 cc. xylene for 4 hours. The reaction product was evaporated in vacuo, the unreacted belladonnine separated and the formed quaternary compound recrystallized from methanol. The yield was 2.7 g. belladonnine-bis-iodisoamylate, M. P. 234° to 236° C. The maximum of absorption was observed at 259 mµ. The extinction $$E_{1\,cm.}^{1\%}$$

at this wavelength was 4.8.

Example 6

4.0 g. belladonnine and 6.2 g. benzylchloride were refluxed in 40 cc. xylene for several hours. Working up the reaction mixture yielded 2.9 g. belladonnine-bis-chlorbenzylate.

$$E_{1\,cm.}^{1\%}$$

for both maxima was 11.3.

Example 7

5.4 g. belladonnine were refluxed with 25 g. dimethylsulfate in 100 cc. benzene for 6 hours. The benzene was distilled off, the dimethylsulfate and unchanged belladonnine were extracted with ether and 6 g. quaternary salt were obtained which after recrystallization from water-acetone melted at 124° to 126° C.

$$E_{1\,cm.}^{1\%}$$

for both maxima was 5.3.

Example 8

An alcoholic solution of apoatropine was refluxed for several hours with an excess of ethylbromide. Five grams of the apoatropinbromethylate thus obtained were heated to 180° C. for a few minutes. The melt was recrystallized from water-acetone. The yield was 0.8 g. belladonnine-bis-bromethylate having the constants given in Example 3.

Example 9

N-ethyltropinium bromide was obtained by prolonged boiling of tropine with ethylbromide. Twenty-five grams of this substance were heated with stirring to temperatures above 100° C. with 30 g. of a mixture of α- and β-isatropic acid as well as 20 cc. water. Dry hydrogen chloride gas was bubbled through the melt for several hours. The water already present and newly formed was continuously distilled off. The residue was recrystallized from water-acetone after removal of unreacted initial materials. The yield was 10 g. belladonnine-bis-bromethylate, M. P. 98° to 101° C.

As stated above, the new quaternary salts of belladonnine prepared in accordance with the present invention were discovered to be therapeutically active in a manner similar to d-tubocurarine. In most cases they exceed the efficacy of this compound substantially. Even more important, however, is the advantage that these salts have been discovered to possess in comparison with d-tubocurarine in regard to tolerability. Thus, the lethal dose of d-tubocurarine is about 25 times as high as the so-called head-drop dose in animal tests in dogs (Bovet and co-workers, Arch. int. pharmacodyn., vol. 88, page 1, 1951), but the products of the present invention are still well tolerated at 100 times the head-drop dose. Consequently, the therapeutic effect of these salts is well controllable in the treatment of patients. Nor do the new compounds cause bronchospasms in curative doses such as is frequently shown by the natural curare preparations.

In clinical testing the bromethylate of belladonnine made in accordance with the present invention was rapidly injected intravenously into healthy, non-narcotized humans in dosages of 5 to 7.5 mg. and caused the following symptoms in the sequence indicated: Loss of visual control (double vision), drooping of the head, drooping of the lower jar, general feeling of warmth, relaxation of skeletal muscles; breathing remained undisturbed when the lower jaw was supported. The hand grip was still strong at a dose of 5 mg. of the bromethylate, but it disappeared at 7.5 mg. Breathing may already be lowered by 50% at 5 mg.

The bromethylate was successfully used by major clinics in more than 300 surgical operations including operations of the lungs, all kinds of abdominal operations, and surgery of the extremities. In this work, pharmacological findings and the results of tests in healthy humans were confirmed. The bromethylate acts curare-like. It is more effective than d-tubocurarine. Two-thirds of the customary curare dose suffices. However, the action of the bromethylate lasts only about half as long as that of d-tubocurarine, and in that respect it stands about midway between the short-lasting bis-choline esters and the long-lasting d-tubocurarine. Thus, the action of the bromethylate can readily be controlled and continuous drop injection is not necessary to maintain paralysis, contrary to the choline esters which are primarily useful for intubation owing to their short-lived action.

As little as 7 to 10 mg. of the bromethylate, depending on the constitution of the patient, gives sufficient muscle relaxation which can be renewed by additional injections every 10 to 20 minutes in order to maintain relaxation during long-lasting operations. However, caution is necessary because the bromethylate, like d-tubocurarine, has a cumulative effect. Several observers have reported that the return of muscle motion is rather abrupt. The most effective antidote to the bromethylate, as in the case of d-tubocurarine, is Neostigmine U. S. P.

The bromethylate is also suitable for intubation which was found to proceed with particular ease. Optimal dose was determined to be 15 to 20 mg. Intubation succeeds without difficulty 5 to 8 minutes after injection of such a dose. The highest dose of the bromethylate used until recently was 60 mg. during an operation, and 40 mg. were needed for a pneumectomy lasting 3 hours.

It was found that the bromethylate apparently causes no bronchospasms as does d-tubocurarine. Blood pressure and pulse are not substantially affected. Increase in secretion, more frequently observed after d-tubocurarine, was missing after administration of the bromethylate. This was shown very clearly from the behavior of gastric juice secreted after stomach resection. Normally the amount of gastric juice secreted after stomach resection during 24 hours is 60 to 80 cc. It stays within that limit when the bromethylate has been administered but increases to over 100 cc. have been observed after d-tubocurarine.

Application of the bromethylate required no increased consumption of narcotics such as barbiturates and laughing gas. Practical tests have so far failed to show disadvantages when bis-choline esters and the bromethylate were administered in sequence. Administered orally, the bromethylate has a weaker, though noticeable, effect than by the intravenous route.

What we claim is:

1. Quaternary salts of belladonnine having the formula $C_{34}H_{42}O_4N_2.x$ halogenalkyl.$yH_2O$, wherein $x$ is equal to 1 or 2, halogenalkyl is a radical selected from the group consisting of bromo- and iodo substituted hydrocarbon radicals in which the alkyl chain contains one to five carbon atoms and $y$ is equal to 0 to 8, generally soluble in water, methanol or ethanol, difficultly soluble to insoluble in acetic ester, benzene, petrolether and diethylether, the main undisturbed maxima of their ultraviolet absorption spectra being at about 258 to 259 and 261 to 262 m$\mu$, and said salts showing the known color reactions of belladonnine.

2. Belladonnine-monohalogenalkylate of the formula $C_{34}H_{42}O_4N_2$.halogenalkyl.$yH_2O$, wherein halogenalkyl is a radical selected from the group consisting of bromo- and iodo substituted hydrocarbon radicals in which the alkyl chain contains one to five carbon atoms and $y$ is equal to 0 to 8.

3. Belladonnine-bis-halogenalkylate of the formula $C_{34}H_{42}O_4N_2.2$ halogenalkyl.$yH_2O$, wherein halogenalkyl is a radical selected from the group consisting of bromo- and iodo substituted hydrocarbon radicals in which the alkyl chain contains one to five carbon atoms and $y$ is equal to 0 to 8.

4. Belladonnine-bis-bromethylate of the formula $$C_{38}H_{52}O_4N_2Br_2$$

5. Belladonnine-bis-bromethylate-tetrahydrate, a colorless crystallized compound melting at about 98° to 101° C., which shows two main maxima of ultraviolet absorption at about 258 and 261 m$\mu$ with $$E_{1\ cm.}^{1\%}$$

equal to about 4.8.

6. Belladonnine-bis-iodomethylate-semihydrate having the formula $C_{36}H_{48}O_4N_2I_2 + \frac{1}{2}H_2O$ and a melting point of about 290° C.

7. Belladonnine-bis-iodoethylate of the formula $$C_{38}H_{52}O_4N_2I_2$$

and melting at about 286° C.

References Cited in the file of this patent

FOREIGN PATENTS

| | | |
|---|---|---|
| 12,237 | Great Britain | of 1912 |
| 145,996 | Germany | Sept. 27, 1902 |
| 448,069 | Canada | Nov. 11, 1952 |

OTHER REFERENCES

Cook and Martin, Remington's Practice of Pharmacy (9th ed., 1948), pp. 837, 838, 840 and 841.